US010147328B2

(12) United States Patent
Mullin

(10) Patent No.: US 10,147,328 B2
(45) Date of Patent: Dec. 4, 2018

(54) GROUND BASED NAVIGATION AID EQUIPMENT FOR AIRCRAFT SAFETY

(71) Applicant: THALES USA, INC., Arlington, VA (US)

(72) Inventor: Richard Mullin, Shawnee, KS (US)

(73) Assignee: THALES USA, INC., Arlington, VA (US)

( * ) Notice: Subject to any disclaimer, the term of this patent is extended or adjusted under 35 U.S.C. 154(b) by 54 days.

(21) Appl. No.: 15/299,128

(22) Filed: Oct. 20, 2016

(65) Prior Publication Data

US 2017/0116865 A1   Apr. 27, 2017

Related U.S. Application Data

(60) Provisional application No. 62/245,138, filed on Oct. 22, 2015.

(51) Int. Cl.
*G08G 5/00* (2006.01)
*G01S 13/78* (2006.01)

(52) U.S. Cl.
CPC .......... *G08G 5/0047* (2013.01); *G01S 13/785* (2013.01)

(58) Field of Classification Search
CPC ....... G01S 1/022; G01S 1/024; G08G 5/0026; G08G 5/0047
See application file for complete search history.

(56) References Cited

U.S. PATENT DOCUMENTS

| 3,900,797 A * | 8/1975 | Mimken ................... G01S 1/02 368/107 |
| 5,790,438 A | 8/1998 | Simonnet |
| 6,222,480 B1 | 4/2001 | Kuntman et al. |
| 6,414,632 B1 * | 7/2002 | Kleiber .................. B64D 45/04 342/173 |
| 2006/0214844 A1 | 9/2006 | Fagan et al. |
| 2010/0001895 A1 | 1/2010 | Leeson |

OTHER PUBLICATIONS

International Search Report and Written Opinion of related International Patent Application No. PCT/US16/58214 dated Jan. 17, 2017.

* cited by examiner

*Primary Examiner* — Anshul Sood
(74) *Attorney, Agent, or Firm* — Sage Patent Group

(57) ABSTRACT

A method, system, and computer-readable medium for performing a hazard analysis of navigation aid equipment using an external safety monitor. Aspects include monitoring performance of the navigation aid equipment. In addition, determination is made if an improper performance of the navigation aid equipment is detected. Furthermore, removal of a signal from an antenna of the navigation aid equipment may occur when improper performance of the navigation aid equipment is detected.

20 Claims, 5 Drawing Sheets

US 10,147,328 B2

GROUND BASED NAVIGATION AID EQUIPMENT FOR AIRCRAFT SAFETY

CROSS-REFERENCE TO RELATED APPLICATION(S)

This application claims the benefit of U.S. Provisional Application Ser. No. 62/245,138, entitled "GROUND BASED NAVIGATION AID EQUIPMENT FOR AIRCRAFT SAFETY" and filed on Oct. 22, 2015, which is expressly incorporated by reference herein in its entirety.

BACKGROUND

Field

The disclosure relates generally to the field of navigation aid equipment, and more specifically to methods, apparatuses, and computer-readable media for providing integrity assurance of navigation aid equipment.

Background

Navigation aid systems provide relevant types of information to aircraft that may allow for safe and accurate aircraft positioning. To assure maximum safety, the radiated signal from navigation aid equipment is continuously monitored by a safety and/or integrity monitor. Navigation aid equipment that incorporates safety and/or integrity monitors include: Distance Measuring Equipment (DME), TACtical Air Navigation (TACAN), Very high frequency Omni-directional Range (VOR), Instrument Landing System (ILS), Marker Beacon (MB), and Non-Directional Beacons (NDB). Each navigation aid system has specific parameters that determine proper and safe performance.

DME systems are used to determine distance with respect to a DME ground station. A DME system may include an Ultra high frequency (UHF) transmitter/receiver in the aircraft (e.g., aircraft DME) and a UHF receiver/transmitter on the ground (e.g., DME ground station). The aircraft DME may determine position by transmitting a series of pulsed pairs to the ground-based DME and, after a predetermined time delay (e.g., 50 μsec), receive a reply from DME ground station that includes an identical sequence of pulsed pairs. Once the identical series of pulsed pairs is received, the aircraft DME may calculate the distance to the DME ground station.

In other words, the DME system provides a way for aircraft to calculate the physical distance to the DME ground station. The distance depends trigonometrically upon both the altitude of the aircraft above the DME ground station and the ground distance from the aircraft to the DME ground station.

DME systems are required to keep a certain degree of accuracy in accordance with international standards set by, for example, the Federal Aviation Administration (FAA), the European Aviation Safety Agency (EASA), the International Civil Aviation Organization (ICAO), etc. To ensure accuracy, flight inspection organizations periodically check critical parameters associated with DME ground stations to calibrate and certify precision of the DME system.

Some legacy navigation aid systems operate using outdated safety criteria. For example, some legacy systems are subject to failure mode, effects, and criticality analysis (FMECA) using a military standard (e.g., MIL-STD-1629) and a failsafe demonstration. However, advances in safety assurance methodology have resulted in newer safety assurance methods that are currently in use. The technologies used in legacy DME systems make it quite expensive to apply the newer safety criteria as safety assurance for such systems.

Therefore, there exists an unmet need in the art for methods, apparatuses, and computer-readable media that monitor the performance of navigation aid systems and reduce the expense of applying more newer safety criteria to legacy navigation aid systems.

SUMMARY

In an aspect of the disclosure, a method, apparatus, and a computer-readable medium for performing hazard analysis of navigation aid equipment using an external safety monitor are provided. The method, apparatus, and medium may monitor performance of the navigation aid equipment. In addition, the method, apparatus, and medium may determine if an improper performance of the navigation aid equipment is detected. Furthermore, the method, apparatus, and medium may remove a signal from an antenna of the navigation aid equipment when improper performance of the navigation aid equipment is detected. The concept of an external monitor is applicable to most ground based navigation aids. Examples include DME, TACAN, VOR, and ILS.

Additional advantages and novel features of these aspects will be set forth in part in the description that follows, and in part will become more apparent to those skilled in the art upon examination of the following or upon learning by practice of the disclosure.

DETAILED DESCRIPTION

Figure 1:
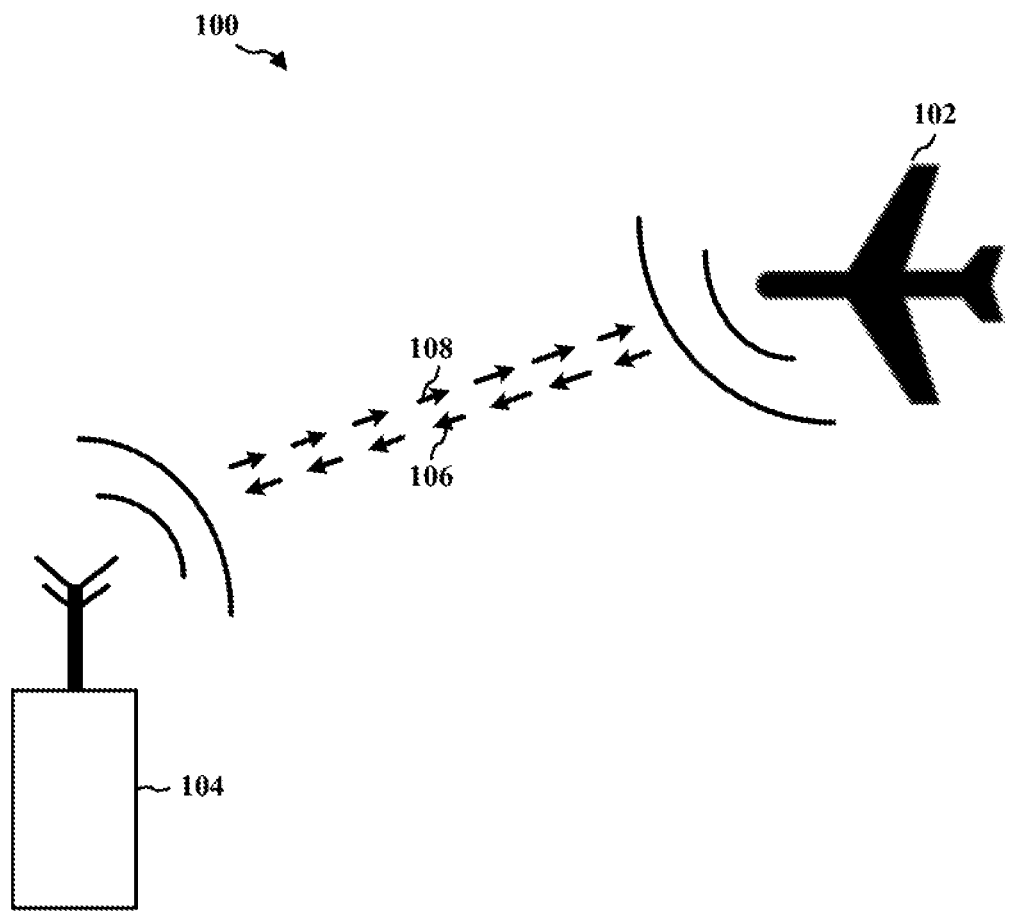
FIG. 1 is a diagram illustrating an example aspect of a navigation aid system in accordance with aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of an external DME safety monitor will now be presented with reference to various methods, apparatuses, and media. These methods, apparatuses, and media will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall implementation.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to include instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, firmware, or any combination thereof. If implemented in software, the functions may be stored on or encoded as one or more instructions or code on a computer-readable medium or media. Computer-readable media includes computer storage media. Storage media may be any available media that is able to be accessed by a computer. By way of example, and not limitation, such computer-readable media may comprise a random-access memory (RAM), a read-only memory (ROM), an electrically erasable programmable ROM (EEPROM), compact disk ROM (CD-ROM) or other optical disk storage, magnetic disk storage or other magnetic storage devices, or any other medium that may be used to carry or store desired program code in the form of instructions or data structures and that may be accessed by a computer. Disk and disc, as used herein, include CD, laser disc, optical disc, digital versatile disc (DVD), and floppy disk, where disks usually reproduce data magnetically, while discs reproduce data optically with lasers. Combinations of the above should also be included within the scope of computer-readable media.

Aspects of the method, apparatus, and medium presented herein may be compatible with various navigation aid systems that are used in determining aircraft position. For example, the method, apparatus, and medium may be compatible with the following: DME, TACAN, VOR, ILS, MB, and NDB. Although the description set forth below refers to a DME, the method, apparatus, and medium of the present disclosure may be used with any of the foregoing navigation aid systems listed above without departing from the scope of the present disclosure.

Legacy DME ground stations or aircraft DME have been used for determining aircraft position for many years. In order to assure maximum safety of the radiated signal from the DME, the present disclosure provides an external safety monitor that is compatible with, e.g., different navigation aid systems that may already be in use. In accordance with aspects of the present disclosure, the external DME safety monitor may perform a hazard analysis of DME ground station equipment that eliminates the expense of applying newer safety criteria, while still assuring the integrity of the performance of legacy DME systems.

FIG. 1 illustrates an overall system diagram of an example DME system 100 for use in accordance with aspects of the present disclosure. The example system of FIG. 1 includes, for example, an aircraft 102 and a DME ground station 104.

To determine a distance to the DME ground station 104, the aircraft 102 may send an interrogation 106 to the DME ground station 104. The interrogation 106 may include a first sequence of signal pulses. In reply to the interrogation 106, the DME ground station 104 may send a response 108 to the aircraft 102 that includes an identical sequence of signal pulses. The aircraft 102 may calculate the distance to the DME ground station 104 based on the reply. Further details regarding DME systems are described in U.S. Pat. No. 3,870,993, titled "Distance Measuring Equipment for Aircraft Employing Precision Distance Measuring Means," which issued on Mar. 11, 1975, the entire contents of which are incorporated herein by reference.

Figure 2:
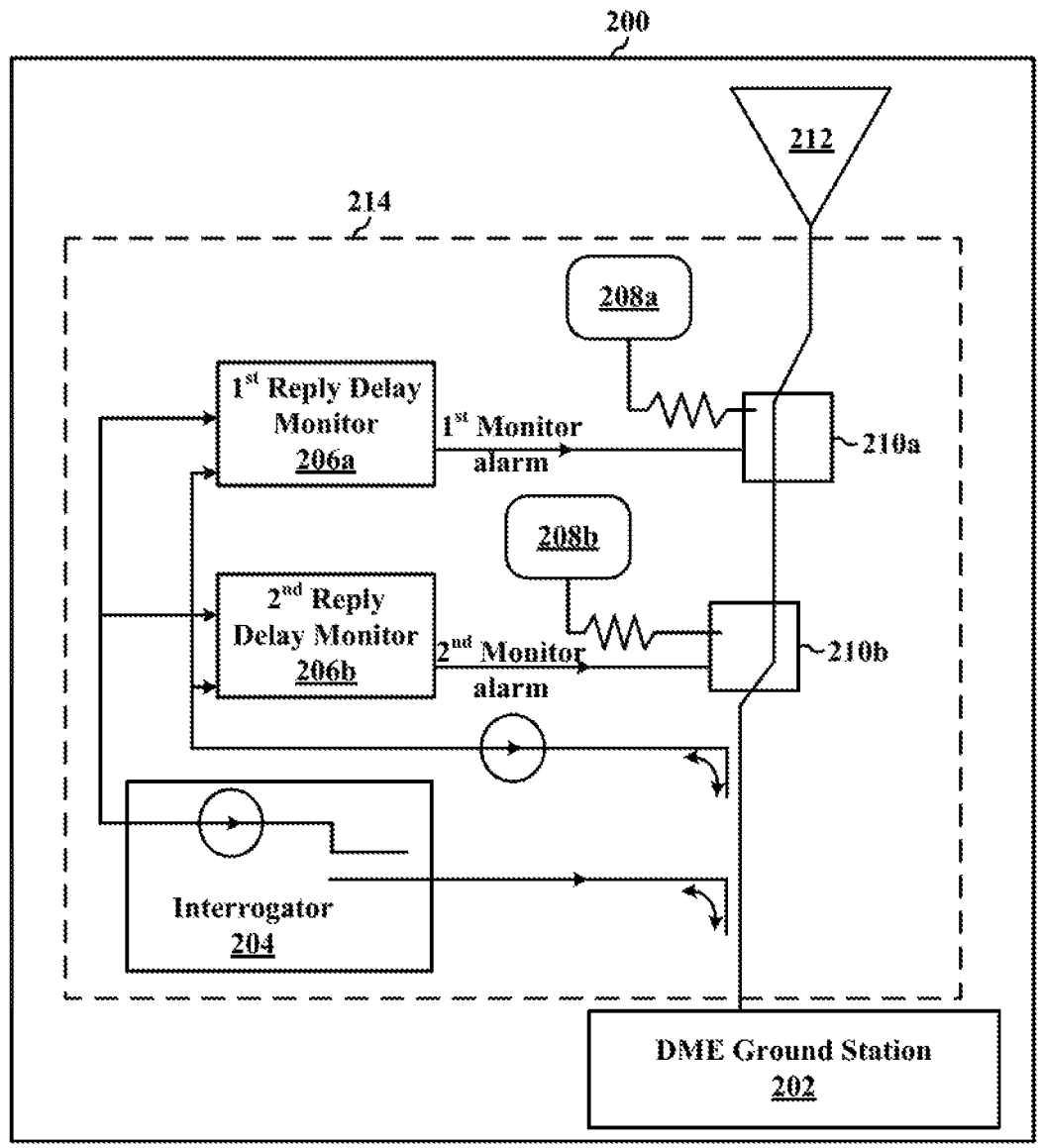
FIG. 2 is a diagram illustrating an example aspect of a DME external safety monitor in accordance with aspects of the present disclosure.

FIG. 2 is an overall system diagram of an example DME ground system 200 for use in accordance with aspects of the present disclosure. The example system of FIG. 2 includes, for example, a DME ground station 202, including a DME antenna 212 configured for communication with aircraft (not shown). In addition, the DME ground system 200 may include an external DME safety monitor 214 that is external to and connected with the DME ground station 202 and the DME antenna 212. For example, the external DME safety monitor 214 may include one or more of an interrogator 204, a first reply delay monitor 206a, a second reply delay monitor 206b, a first detector 208a, a second detector 208b, a first transfer device 210a, and a second transfer device 210b. A signal line and/or bus architecture may be used to connect each of the components in the DME ground system 200 to one another.

Still referring to FIG. 2, the interrogator 204 may monitor performance of the DME ground station 202. For example, the interrogator 204 may interrogate the DME ground station 202 with a first sequence of signal pulses when a timing signal indicates the start of an interrogation procedure. In an aspect, the first sequence of signal pulses may mimic the interrogation 106 by the aircraft 102 in FIG. 1. The DME ground station 202 may respond to the interrogation by sending a reply to the interrogator 204, the first reply delay monitor 206a, and/or the second reply delay monitor 206b. In one aspect, the reply may include a second sequence of signal pulses that is identical to the first sequence of signal pulses. For example, the second sequence of signal pulses may mimic response 108 that is transmitted to the aircraft 102 in reply to the interrogation 106 in FIG. 1.

In a first example embodiment, the reply to the interrogation may be sent from the DME ground station 202 to the interrogator 204. In the first example embodiment, the interrogator 204 may send the reply to the first reply delay monitor 206a and/or the second reply delay monitor 206b. In a second example embodiment, the reply to the interrogation may be sent from the DME ground station 202 directly to the first reply delay monitor 206a and/or the second reply delay monitor 206b.

In either the first example embodiment or the second example embodiment, one or more of the first reply delay monitor 206a and/or the second reply delay monitor 206b may be used to determine if an improper performance of the DME ground station 202 is detected. For example, improper performance may be detected if either of the reply delay monitors 206a, 206b determines that a time delay in the second sequence of signal pulses received from the DME ground station 202 is outside of a tolerance range. In an aspect, the tolerance range may be associated with a set time delay (e.g., 50 μsec). Additionally and/or alternatively, improper performance may be detected if either of the reply delay monitors 206a, 206b determines that an internal clock of the DME ground station 202 is inaccurate based on the time delay of the second sequence of signal pulses. Still further, improper performance may be detected if no reply to the interrogation is received by the first reply delay monitor 206a and/or the second reply delay monitor 206b.

With further reference to FIG. 2, when improper performance of the DME ground station 202 is detected an alarm signal (e.g., first monitor alarm signal and/or a second monitor alarm signal) may be sent to the redundant transfer devices 210a, 210b. The transfer devices 210a, 210b (e.g., redundant transfer devices) may be used to remove a signal from the DME antenna 212. In one aspect, each of the redundant transfer devices 210a, 210b may include a switching circuit. For example, each of the redundant transfer devices 210a, 210b may include an optical coupling semiconductor switching circuit that is operated by optical signals received from the first detector 208a (e.g., coupled to the first transfer device 210a) and/or the second detector 208b (e.g., coupled to the second transfer device 210b). Each of the detectors 208a, 208b may include, for example, a light-emitting diode, a light detector, an impedance circuit, and/or a semiconductor switching device such as a field effect transistor (FET) transistor that is connected to one of the transfer devices 210a, 210b.

In one aspect, the light detector may receive light from a light emitting device when a signal (e.g., first monitor alarm signal and/or second monitor alarm signal) is received from one or more of the first reply delay monitor 206a and/or the second reply delay monitor 206b. For example, the light detector may change a light signal to an electrical signal to generate a voltage signal. The voltage signal, which is output from the light detector, may be input to the impedance circuit. The transfer devices 210a, 210b may remove one or more signals from the DME antenna 212 when a voltage signal is received from the detectors 208a, 208b via the impedance circuit. In an aspect, signals may be removed from the DME antenna 212 so that an improper reply (e.g., a reply with an incorrect timing delay) to an aircraft interrogation will not be transmitted when the DME ground station 202 is not performing properly.

In this way, the DME ground system 200 of the present disclosure may perform a hazard analysis of a DME ground station that eliminates the expense of applying newer safety criteria to legacy systems while assuring and/or improving the integrity of the performance of legacy DME systems by using an external DME safety monitor.

Figure 3:
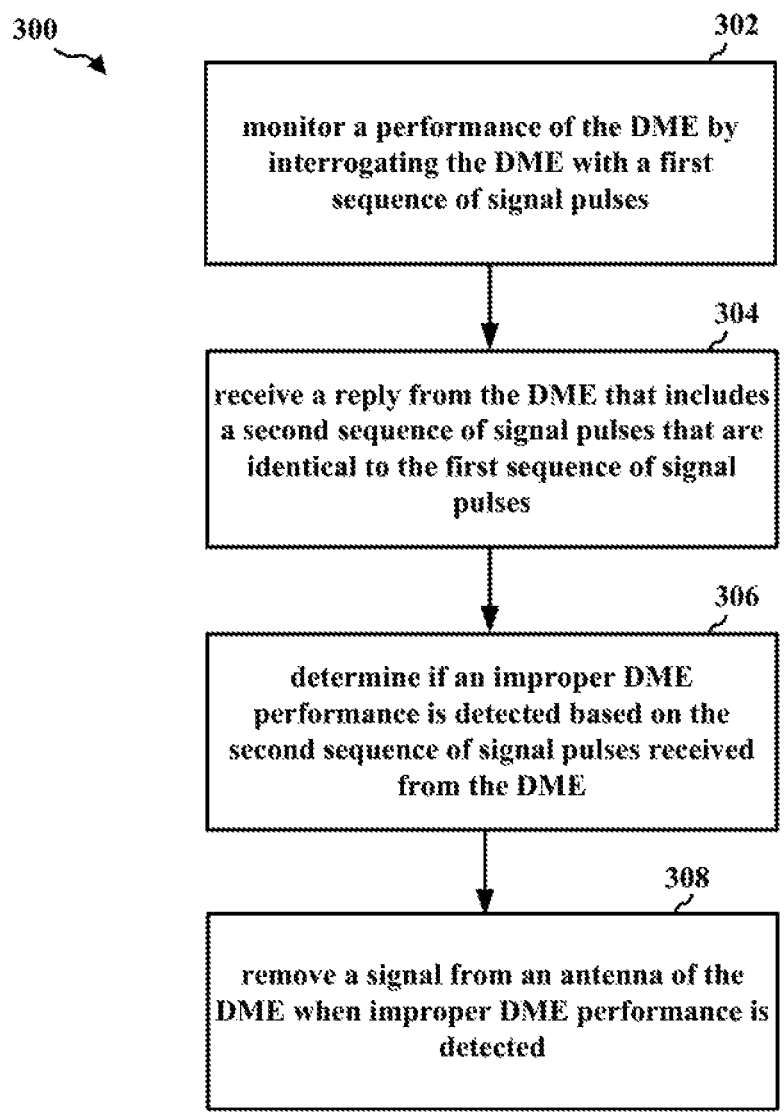
FIG. 3 is a flowchart of a method performing a hazard analysis of navigation aid equipment using a safety monitor in accordance with aspects of the present disclosure.

FIG. 3 is flowchart 300 of a method of performing a hazard analysis of navigation aid equipment using an external safety monitor. For example, the method may be performed by the external DME safety monitor 214 illustrated in FIG. 2. In an aspect, the method described infra with respect to FIG. 3 may be used to ensure the integrity of a DME system, a TACAN system, a VOR system, an ILS, an MB, and an NDB in communication with an aircraft.

In 302, the safety monitor is able to monitor a performance of the navigation aid equipment by interrogating the navigation aid equipment with a first sequence of signal pulses. For example, referring to FIG. 2, the interrogator 204 may monitor the performance of the DME ground station 202 by interrogating the DME ground station 202 with a first sequence of signal pulses.

In 304, the safety monitor is able to receive a reply from the navigation aid equipment that includes a second sequence of signal pulses. For example, the second sequence of signal pulses may be identical to the first sequence of signal pulses, or different from the first sequence of signal pulses. For example, referring to FIG. 2, the DME ground station 202 may respond to the interrogation by sending a reply to the interrogator 204, the first reply delay monitor 206a, and/or the second reply delay monitor 206b. In one aspect, the reply may include a second sequence of signal pulses that are identical to the first sequence of signal pulses. For example, the second sequence of signal pulses may mimic the signal pulses 108 that are transmitted to the aircraft 102 in FIG. 1. In a first example embodiment, the reply to the interrogation may be sent from the DME ground station 202 to the interrogator 204. In the first example embodiment, the interrogator 204 may send the reply to the first reply delay monitor 206a and/or the second reply delay monitor 206b. In a second example embodiment, the reply to the interrogation may be sent from the DME ground station 202 directly to the first reply delay monitor 206a and/or the second reply delay monitor 206b.

In 306, the safety monitor is able to determine if an improper navigation aid performance is detected, based on the second sequence of signal pulses received from the navigation aid equipment. For example, referring to FIG. 2, one or more of the first reply delay monitor 206a and/or the second reply delay monitor 206b may be used to determine if an improper performance of the DME ground station 202 is detected. In an aspect, the reply that includes the second sequence of signal pulses may be used to detect an improper performance of the DME ground station 202. For example, improper performance may be detected if either of the reply delay monitors 206a, 206b determines that a time delay in the second sequence of signal pulses received from the DME ground station 202 is outside of a tolerance range. In an aspect, the tolerance range may be associated with a set time delay (e.g., 50 μsec). Additionally and/or alternatively, improper performance may be detected if either of the reply delay monitors 206a, 206b determines that an internal clock of the DME ground station 202 is inaccurate based on the time delay of the second sequence of signal pulses. Still further, improper performance may be detected if no reply to the interrogation is received by the first reply delay monitor 206a and/or the second reply delay monitor 206b.

In 308, the safety monitor is able to remove a signal from an antenna of the navigation aid equipment when improper performance is detected. For example, referring to FIG. 2, when improper performance of the DME ground station 202 is detected by either or both of the reply delay monitors 206a, 206b, the transfer devices 210a, 210b (e.g., redundant transfer devices) may remove a signal from the DME antenna 212. Each of the redundant transfer devices 210a, 210b may include a switching circuit. For example, each of the redundant transfer devices 210a, 210b may include an optical coupling semiconductor switching circuit that is operated by optical signals received from the first detector 208a (e.g., coupled to the first transfer device 210a) and/or the second detector 208b (e.g., coupled to the second transfer device 210b). Each of the detectors 208a, 208b may include, for example, a light-emitting diode, a light detector, an impedance circuit, and/or a semiconductor switching device such as a field effect transistor (FET) transistor that is connected to one of the transfer devices 210a, 210b. In one aspect, the light detector may receive light from a light emitting device when a signal is received from one or more of the first reply delay monitor 206a and/or the second reply delay monitor 206b. For example, the light detector may change a light signal to an electric signal to generate a voltage signal. The voltage signal, which is output from the light detector, may be input to the impedance circuit. The transfer devices 210a, 210b may remove one or more signals from the DME antenna 212 when a voltage signal is received from the detectors 208a, 208b via the impedance circuit. In an aspect, signals may be removed from the DME antenna 212 so that an improper reply (e.g., a reply with an incorrect timing delay) to an aircraft interrogation will not be transmitted when the DME ground station 202 is not performing properly.

Figure 4:
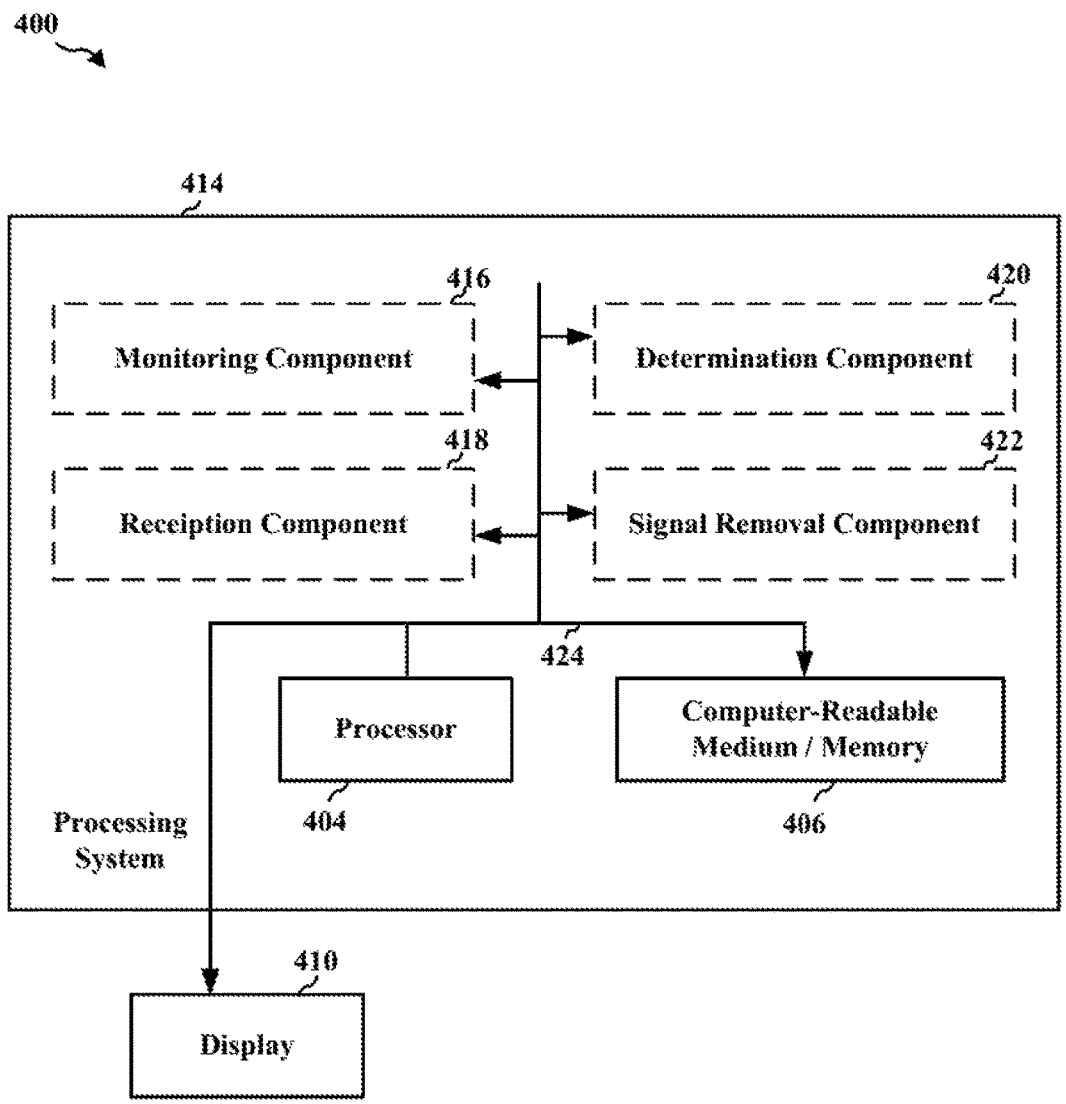
FIG. 4 is a system diagram illustrating various example hardware components and other features, for use in accordance with aspects of the present disclosure.

FIG. 4 is a diagram illustrating an example hardware implementation for a system 400 employing a processing system 414. The processing system 414 may be implemented with an architecture that links together various circuits, including, for example, one or more processors and/or components, represented by the processor 404, the components 202, 204, 206a, 206b, 208a, 208b, 210a, 210b, 212, 214 and the computer-readable medium/memory 406.

The processing system 414 may be coupled to a DME ground station 202, including a DME antenna 212, an external DME safety monitor 214 made up of an interrogator 204, a first reply delay monitor 206a, a second reply delay monitor 206b, a first transfer device 210a, a second transfer device 210b, a first detector 208a, and a second detector 2086.

The processing system 414 may include a processor 404 coupled to a computer-readable medium/memory 406 via bus 424. The processor 404 may be responsible for general processing, including the execution of software stored on the computer-readable medium/memory 406. The software, when executed by the processor 404, may cause the processing system 414 to perform various functions described supra for any particular apparatus and/or system. The computer-readable medium/memory 406 may also be used for storing data that is manipulated by the processor 404 when executing software. The processing system may further include at least one of the components 202, 204, 206a, 206b, 208a, 208b, 210a, 210b, 212, and 214. The components may comprise software components running in the processor 404, resident/stored in the computer readable medium/memory 406, one or more hardware components coupled to the processor 404, or some combination thereof. The processing system 414 may comprise a component of a DME ground system 200, as illustrated in FIG. 2.

The system 400 may further include a monitoring component 416 for monitoring performance of navigation aid equipment. In some aspects, monitoring component 416 may be configured to monitor the performance of the navigation aid equipment, for example, by interrogating the navigation aid equipment with a first sequence of signal pulses. The system 400 may also include a determining component 420 for determining if an improper performance of the navigation aid equipment is detected. The system 400 may also include a reception component 418 for receiving a reply from the navigation aid equipment based on the interrogation. In some aspects, the reply may include a second sequence of signal pulses that are identical to the first sequence of signal pulses. In further aspects, the determination component 420 may be configured to determine if a time delay in the second sequence of signal pulses received from the navigation aid equipment is outside of a tolerance range. in further aspects, the determination component 420 may be further configured to determine if an internal clock of the navigation aid equipment is inaccurate based on the time delay of the identical sequence of signal pulses received from the navigation aid equipment. In further aspects, the determination component 420 may be configured to determine if a reply to the first sequence of signal pulses is not received from the navigation aid equipment. The system 400 may also include a signal removal component 422 for removing a signal from an antenna of the navigation aid equipment when improper performance of the navigation aid equipment is detected. In other aspects, the signal from the antenna of the navigation aid equipment may be removed using a redundant transfer device and the redundant transfer device may comprise at least one switching circuit. In other aspects, the signal may be removed from the antenna of the navigation aid equipment, such that the signal is not transmitted to an aircraft. The system 400 may comprise a safety monitor (e.g., display 410) external to the navigation aid equipment. The navigation aid equipment may be part of a DME ground system in communication with an aircraft.

The aforementioned features may be carried out via one or more of the aforementioned components of the system 400 and/or the processing system 414 of the system 300 configured to perform the functions recited by the aforementioned features.

Thus, aspects may include a system for performing a hazard analysis of navigation aid equipment using a safety monitor, e.g., in connection with FIG. 3.

The system may include additional components that perform each of the functions of the method of the aforementioned flowchart of FIG. 3, or other algorithm. As such, each block in the aforementioned flowchart of FIG. 3 may be performed by a component, and the system may include one or more of those components. The components may include one or more hardware components specifically configured to carry out the stated processes/algorithm, implemented by a processor configured to perform the stated processes/algorithm, stored within a computer-readable medium for implementation by a processor, or some combination thereof.

Thus, aspects may include a non-transitory computer-readable medium for performing a hazard analysis of navigation aid equipment using a safety monitor, the non-transitory computer-readable medium having control logic stored therein for causing a computer to perform the aspects described in connection with, e.g., FIG. 3.

Figure 5:
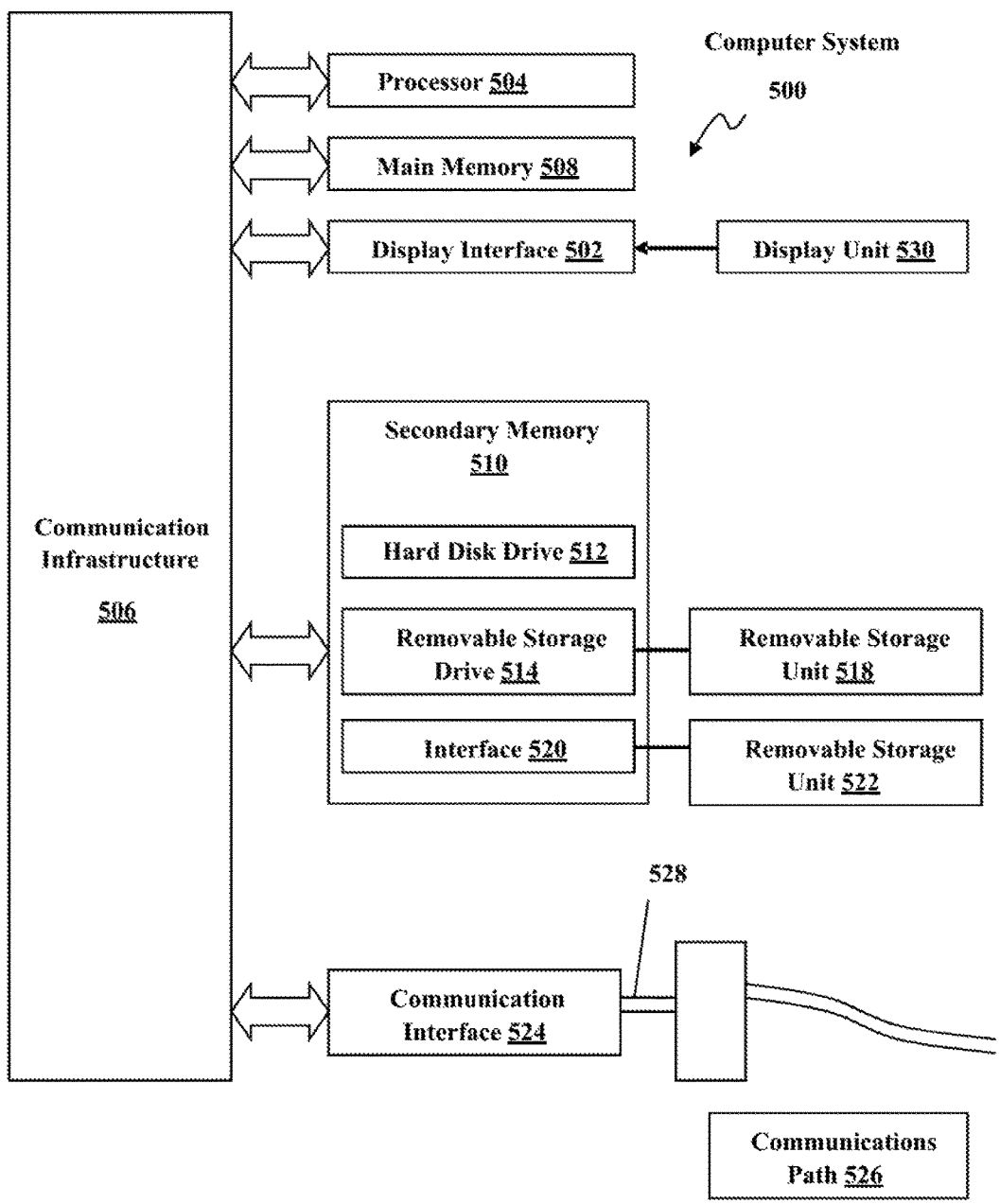
FIG. 5 is a diagram illustrating an example aspect of a general-purpose computer system on which various features of the systems and methods for providing mobile ad hoc networking capability to a radio system may be implemented according to aspects of the invention.

FIG. 5 is an example system diagram of various hardware components and other features, for use in accordance with aspects presented herein. The aspects may be implemented using hardware, software, or a combination thereof and may be implemented in one or more computer systems or other processing systems. In one example, the aspects may include one or more computer systems capable of carrying out the functionality described herein, e.g., in connection with FIG. 3. An example of such a computer system 400 is shown in FIG. 4.

In FIG. 5, computer system 500 includes one or more processors, such as processor 504. The processor 504 is connected to a communication infrastructure 506 (e.g., a communications bus, cross-over bar, or network). Various software aspects are described in terms of this example computer system. After reading this description, it will become apparent to a person skilled in the relevant art(s) how to implement the aspects presented herein using other computer systems and/or architectures.

Computer system 500 can include a display interface 502 that forwards graphics, text, and other data from the communication infrastructure 506 (or from a frame buffer not shown) for display on a display unit 530. Computer system 500 also includes a main memory 508, preferably random access memory (RAM), and may also include a secondary memory 510. The secondary memory 510 may include, for example, a hard disk drive 512 and/or a removable storage drive 514, representing a floppy disk drive, a magnetic tape drive, an optical disk drive, etc. The removable storage drive 514 reads from and/or writes to a removable storage unit 518 in a well-known manner. Removable storage unit 518, represents a floppy disk, magnetic tape, optical disk, etc., which is read by and written to removable storage drive 514. As will be appreciated, the removable storage unit 518 includes a computer usable storage medium having stored therein computer software and/or data.

In alternative aspects, secondary memory 510 may include other similar devices for allowing computer programs or other instructions to be loaded into computer system 500. Such devices may include, for example, a removable storage unit 522 and an interface 520. Examples of such may include a program cartridge and cartridge interface (such as that found in video game devices), a removable memory chip (such as an erasable programmable read only memory (EPROM), or programmable read only memory (PROM)) and associated socket, and other removable storage units 522 and interfaces 520, which allow software and data to be transferred from the removable storage unit 522 to computer system 500.

Computer system 500 may also include a communications interface 524. Communications interface 524 allows software and data to be transferred between computer system 500 and external devices. Examples of communications interface 524 may include a modem, a network interface (such as an Ethernet card), a communications port, a Personal Computer Memory Card International Association (PCMCIA) slot and card, etc. Software and data transferred via communications interface 524 are in the form of signals 528, which may be electronic, electromagnetic, optical or other signals capable of being received by communications interface 524. These signals 528 are provided to communications interface 524 via a communications path (e.g., channel) 526. This path 526 carries signals 528 and may be implemented using wire or cable, fiber optics, a telephone line, a cellular link, a radio frequency (RF) link and/or other communications channels. In this document, the terms "computer program medium" and "computer usable medium" are used to refer generally to media such as a removable storage drive 514, a hard disk installed in hard disk drive 512, and signals 528. These computer program products provide software to the computer system 500. Aspects presented herein may include such computer program products.

Computer programs (also referred to as computer control logic) are stored in main memory 508 and/or secondary memory 510. Computer programs may also be received via communications interface 524. Such computer programs, when executed, enable the computer system 500 to perform the features presented herein, as discussed herein. In particular, the computer programs, when executed, enable the processor 504 to perform the features presented herein. Accordingly, such computer programs represent controllers of the computer system 500.

In aspects implemented using software, the software may be stored in a computer program product and loaded into computer system 500 using removable storage drive 514, hard disk drive 512, or communications interface 524. The control logic (software), when executed by the processor 504, causes the processor 504 to perform the functions as described herein. In another example, aspects may be implemented primarily in hardware using, for example, hardware components, such as application specific integrated circuits (ASICs). Implementation of the hardware state machine so as to perform the functions described herein will be apparent to persons skilled in the relevant art(s).

In yet another example, aspects presented herein may be implemented using a combination of both hardware and software.

While the aspects described herein have been described in conjunction with the example aspects outlined above, various alternatives, modifications, variations, improvements, and/or substantial equivalents, whether known or that are or may be presently unforeseen, may become apparent to those having at least ordinary skill in the art. Accordingly, the example aspects, as set forth above, are intended to be illustrative, not limiting. Various changes may be made without departing from the spirit and scope of the disclosure. Therefore, the disclosure is intended to embrace all known or later-developed alternatives, modifications, variations, improvements, and/or substantial equivalents.

Thus, the claims are not intended to be limited to the aspects shown herein, but are to be accorded the full scope consistent with the language of the claims, wherein reference to an element in the singular is not intended to mean "one and only one" unless specifically so stated, but rather "one or more." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

It is understood that the specific order or hierarchy of the processes/flowcharts disclosed is an illustration of example approaches. Based upon design preferences, it is understood that the specific order or hierarchy in the processes/flowcharts may be rearranged. Further, some features/steps may be combined or omitted. The accompanying method claims present elements of the various features/steps in a sample order, and are not meant to be limited to the specific order or hierarchy presented.

Further, the word "example" is used herein to mean "serving as an example, instance, or illustration." Any aspect described herein as "example" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. Nothing disclosed herein is intended to be dedicated to the public regardless of whether such disclosure is explicitly recited in the claims.

The invention claimed is:

1. A method of performing a hazard analysis of navigation aid equipment using an external safety monitor, the method comprising:
monitoring performance of the navigation aid equipment by interrogating the navigation aid equipment with a first sequence of signal pulses;

receiving, from the navigation aid equipment, a reply including a second sequence of signal pulses;

determining if the performance includes any improper performance of the navigation aid equipment by determining whether any time delay in the second sequence of pulses received from the navigation aid equipment is outside of a tolerance range; and removing a signal from an antenna of the navigation aid equipment when any improper performance of the navigation aid equipment is determined.

2. The method of claim 1, wherein determining if the performance includes any improper performance of the navigation aid equipment further comprises:

determining if an internal clock of the navigation aid equipment is inaccurate based on any time delay of the second sequence of signal pulses received from the navigation aid equipment.

3. The method of claim 1, wherein the determining if the performance includes any improper performance of the navigation aid equipment further comprises:

determining if a reply to the first sequence of signal pulses is not received from the navigation aid equipment.

4. The method of claim 1, wherein the signal from the antenna of the navigation aid equipment is removed using a redundant transfer device.

5. The method of claim 4, wherein the redundant transfer device includes at least one switching circuit.

6. The method of claim 1, wherein the signal is removed from the antenna of the navigation aid equipment such that the signal is not transmitted to an aircraft.

7. The method of claim 1, wherein the navigation aid equipment is part of a distance Measurement equipment (DME) ground system, a TACtical Air Navigation (TACAN) system, a Very high frequency Omni-directional Range (VOR) system, an Instrument Landing System (ILS), Marker Beacon (MB), and Non-Directional Beacons (NDB) in communication with an aircraft.

8. The method of claim 1 wherein removing the signal from the antenna of the navigation aid equipment when any improper performance of the navigation aid equipment is determined comprises preventing any reply outside of the tolerance range to an aircraft interrogation signal from being transmitted.

9. The method of claim 1 further comprising:

determining if any reply from the navigation aid equipment to an aircraft interrogation signal is outside of the tolerance range; and preventing any reply from the navigation aid equipment to an aircraft interrogation signal that is outside of the tolerance range from being transmitted by the antenna.

10. An external apparatus for performing a hazard analysis of navigation aid equipment, the apparatus comprising:

a memory; and a processing system coupled to the memory and configured to:

monitor performance of the navigation aid equipment by interrogating the navigation aid equipment with a first sequence of pulses;

receive, from the navigation aid equipment, a reply based on the interrogation, wherein the reply includes a second sequence of signal pulses;

determine if the performance includes any improper performance of the navigation aid equipment by determining if any time delay in the second sequence of signal pulses received from the navigation aid equipment is outside of a tolerance range; and remove a signal from an antenna of the navigation aid equipment when any improper performance of the navigation aid equipment is determined.

11. The external apparatus of claim 10, wherein the processing system is further configured to determine if the performance includes any improper performance of the navigation aid equipment by:

determining if an internal clock of the navigation aid equipment is inaccurate based on the time delay of the second sequence of signal pulses received from the navigation aid equipment.

12. The external apparatus of claim 10, wherein the processing system is further configured to determine if the performance includes any improper performance of the navigation aid equipment by:

determining if a reply to the first sequence of signal pulses is not received from the navigation aid equipment.

13. The external apparatus of claim 10, wherein:

the signal from the antenna of the navigation aid equipment is removed using a redundant transfer device;

the redundant transfer device comprises at least one switching circuit; and the signal is removed from the antenna of the navigation aid equipment such that the signal is not transmitted to an aircraft.

14. The external apparatus of claim 10, wherein the navigation aid equipment is part of a distance measurement equipment (DME) ground system, a TACtical Air Navigation (TACAN) system, a Very high frequency Omni-directional Range (VOR) system, an instrument Landing System (ILS), Marker Beacon (MB), and Non-Directional Beacons (NDB) in communication with an aircraft.

15. The external apparatus of claim 10 wherein to remove the signal from the antenna of the navigation aid equipment when any improper performance of the navigation aid equipment is determined, the processing system is further configured to prevent any reply outside of the tolerance range to an aircraft interrogation signal from being transmitted.

16. The external apparatus of claim 10 wherein the processing system is further configured to:

determine if any reply from the navigation aid equipment to an aircraft interrogation signal is outside of the tolerance range; and prevent any reply from the navigation aid equipment to an aircraft interrogation signal that is outside of the tolerance range from being transmitted by the antenna.

17. A non-transitory computer-readable medium storing computer executable code for performing a hazard analysis of navigation aid equipment using an external safety monitor, comprising code for:

monitoring a performance of the navigation aid equipment by interrogating the navigation aid equipment with a first sequence of signal pulses;

receiving, from the navigation aid equipment, a reply including a second sequence of signal pulses;

determining if an improper performance of the navigation aid equipment is detected by determining whether any time delay in the second sequence of pulses received from the navigation aid equipment is outside of a tolerance range; and removing a signal from an antenna of the navigation aid equipment when improper navigation aid equipment performance is detected.

18. The computer-readable medium of claim 17, wherein the navigation aid equipment is part of a distance measurement equipment (DME) ground system, a TACtical Air Navigation (TACAN) system, a Very high frequency Omnidirectional Range (VOR) system, an Instrument Landing System (ILS), Marker Beacon (MB), and Non-Directional Beacons (NDB) in communication with an aircraft.

19. The computer-readable medium of claim 17 wherein removing the signal from the antenna of the navigation aid equipment when any improper performance of the navigation aid equipment is determined comprises preventing any reply outside of the tolerance range to an aircraft interrogation signal from being transmitted.

20. The computer-readable medium of claim 17, comprising further code for:
  determining if any reply from the navigation aid equipment to an aircraft interrogation signal is outside of the tolerance range; and
  preventing any reply from the navigation aid equipment to an aircraft interrogation signal that is outside of the tolerance range from being transmitted by the antenna.

* * * * *